Oct. 27, 1936.   E. M. LONG   2,058,808
LENS DRILLING MACHINE
Filed July 18, 1934   4 Sheets-Sheet 1
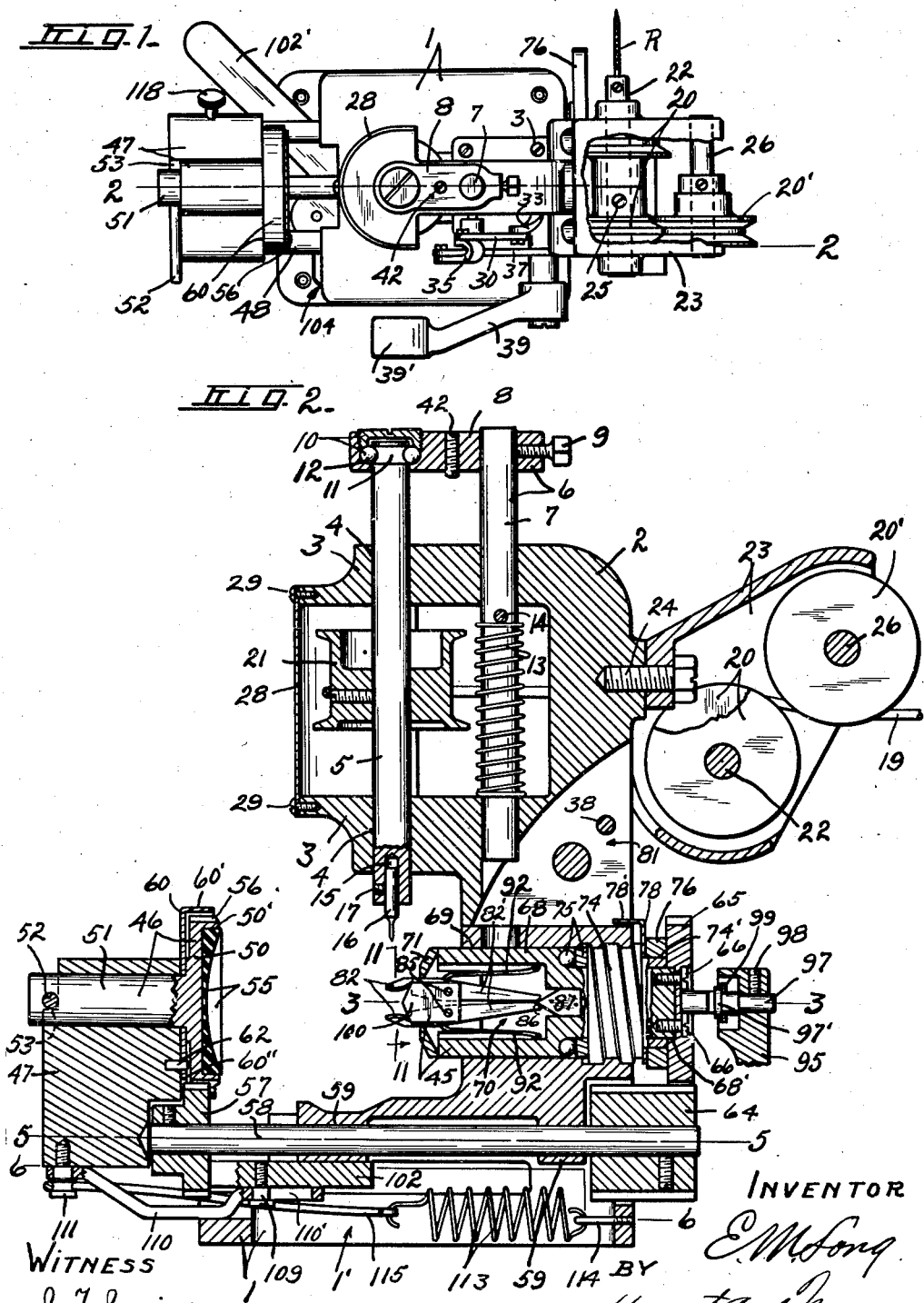

Oct. 27, 1936.  E. M. LONG  2,058,808
LENS DRILLING MACHINE
Filed July 18, 1934  4 Sheets-Sheet 2
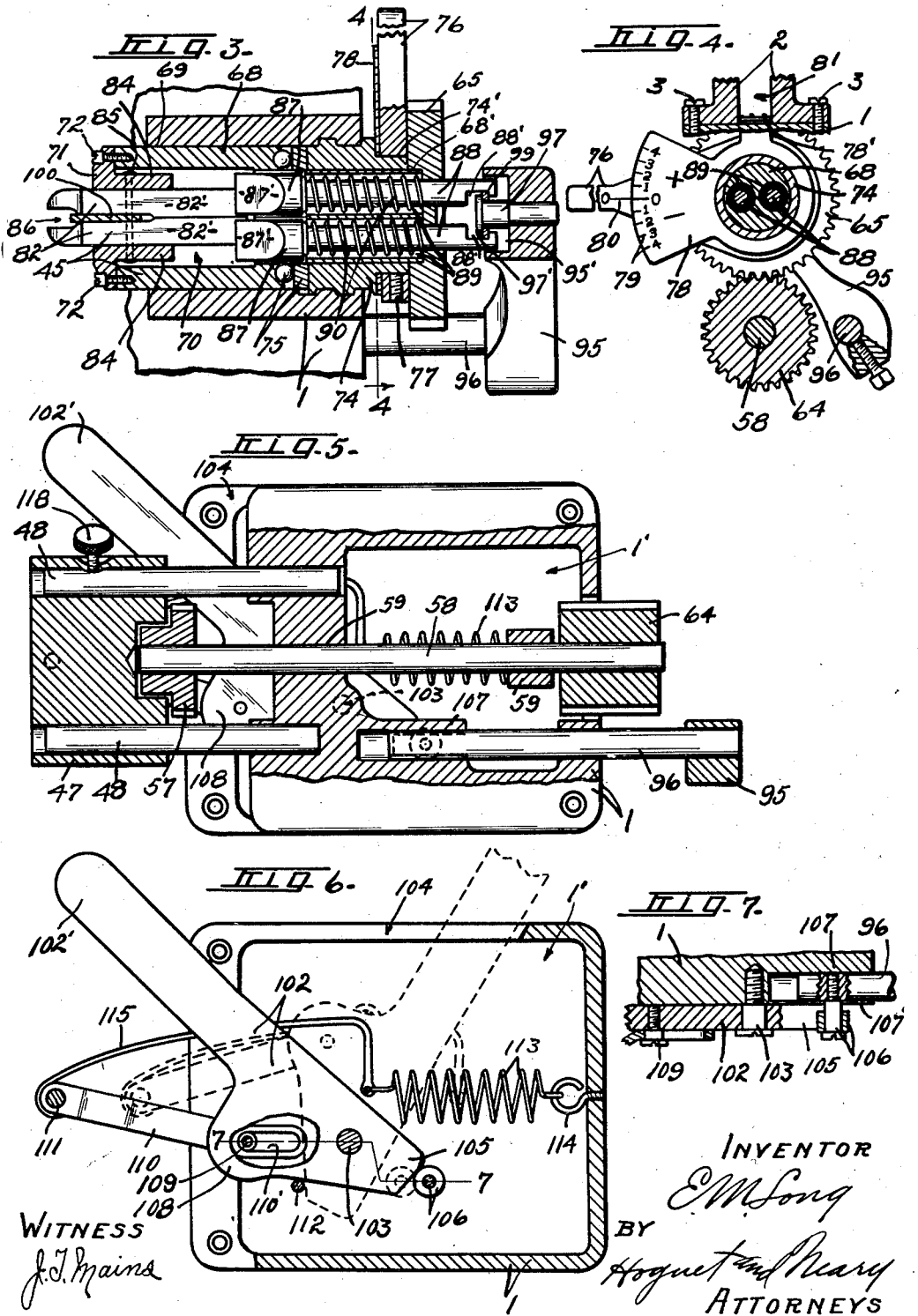

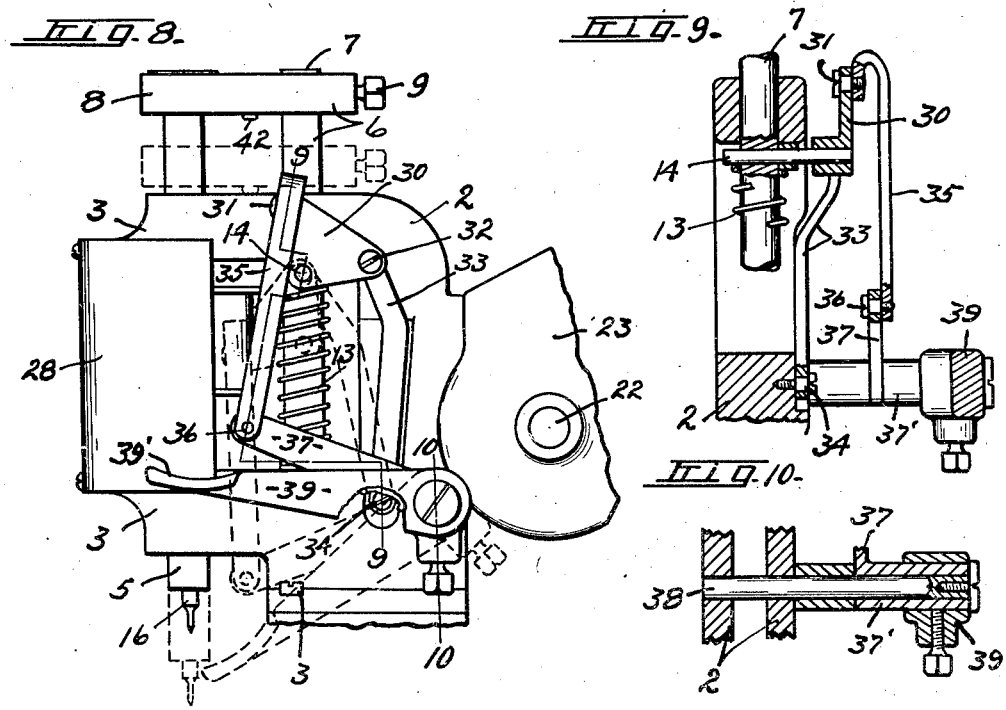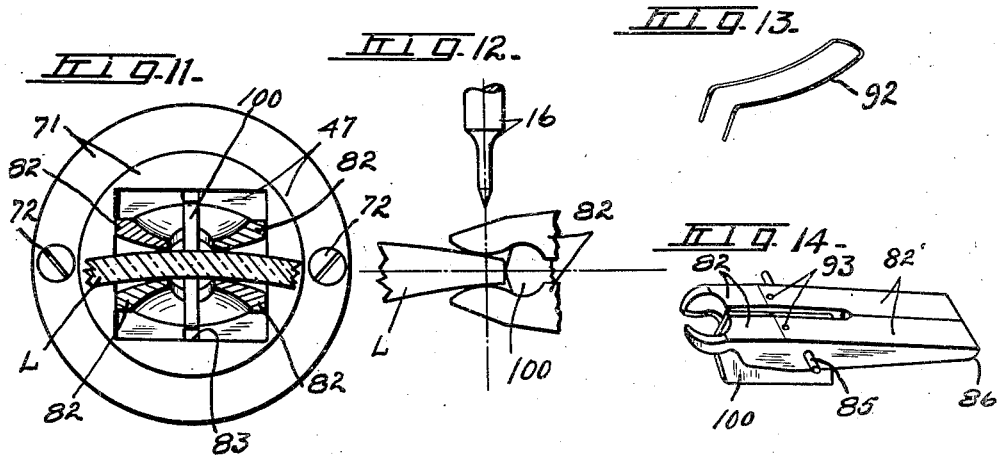

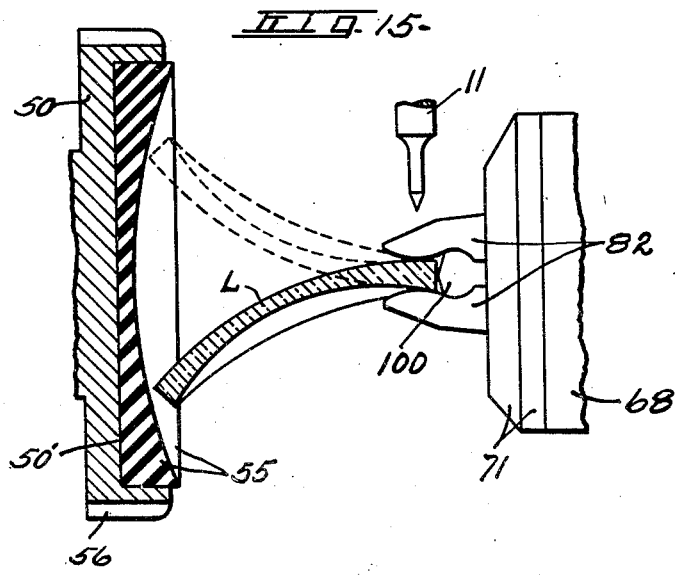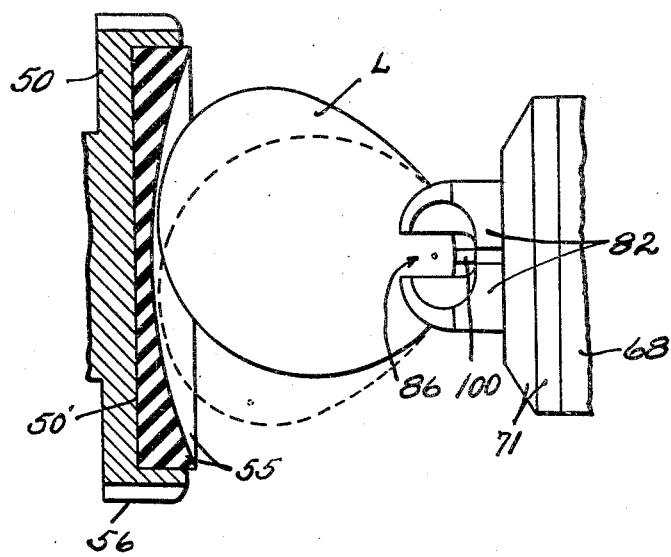

Patented Oct. 27, 1936

2,058,808

UNITED STATES PATENT OFFICE 2,058,808

LENS DRILLING MACHINE

Eli M. Long, Geneva, N. Y., assignor to Shuron Optical Company, Inc., Geneva, N. Y., a corporation of New York Application July 18, 1934, Serial No. 735,731

23 Claims. (Cl. 77—63)

This invention relates to certain new and useful improvements in lens drilling machines with which a hole may be formed through the work or lens by first drilling substantially one-half way through the lens from one side and then turning the lens over and drilling in from the opposite or reverse side to meet the first hole so as to avoid cracking or chipping of the lens adjacent the hole.

It is a well known fact that the contour or curvature of the side surfaces of lens not only vary greatly in different lenses, but that the opposite side surfaces of a lens often vary considerably in contour or curvature from each other.

In lens drilling machines as heretofore constructed insofar as applicant is aware, the lens has been held by the machine with the surface adjacent the drill substantially normal to the axis of movement of the drill with the result that when drilling in from opposite surfaces when said surfaces are formed with different curvatures, the holes thus made very seldom exactly aline. This necessitates the further operation of reaming out the holes formed by the drill to obtain a hole extending through the lens capable of receiving a screw therethrough adapted to secure an end-piece or nose-piece clamp, or lens strap, to the lens.

It is a primary object of this invention to produce a lens drilling machine in which the lens will be maintained in such relation to the drill during the drilling thereof that the intermedial plane of the lens at the point where the hole is to be made will lie practically normal to the axis of movement of the drill, or, in other words, to produce a drilling machine wherein the lens will be held in such a manner that the drill will move substantially normally through the plane lying substantially midway between the side surfaces of the lens irrespective of any difference in the arc or degree of curvature of the surfaces of these sides at the point of drilling.

A more specific object of the invention resides in providing a lens drilling machine with an improved work or lens holder. In carrying out this latter object, I have provided a holder which is simple in construction and operation in that it rotates about a fixed axis which is substantially normal to the axis of movement of the drill for presenting opposite sides of the lens to the drill. This arrangement of the drill holder enables the operator to turn the lens substantially one-half revolution without either removing the lens from the chuck or from the drilling zone as is usually the case in the conventional type of lens drilling machines.

Another advantage obtained in my improved work holder resides in a novel work supporting chuck which grips opposite side surfaces of the lens in close proximity to the point where the lens is to be drilled, instead of at the peripheral edge of the lens as is the case in conventionally constructed lens drilling machines with which the applicant is familiar. This feature of applicant's invention not only provides a firmer support for the lens at the point where the greatest stress occurs, but also enables the provision of a work holder which is more universal in operation in that it provides a structure by which all varieties of lenses within range of the machine may be positioned in the same general relation to the drill to obtain a uniform drilling from opposite sides of the lens without necessitating any changes or adjustments of the work holder elements.

Further objects of the invention are to provide a lens drilling machine which is small, compact, and sturdy in construction, and which is simple, accurate and dependable in operation.

In obtaining these latter objects, I have produced a lens holder which is actuated by the manipulation of but one lever for operatively engaging a lens and automatically positioning the lens in uniform predetermined relation to the movement of the drill.

Another object is to provide a readily operated adjusting means for regulating the distance the hole is to be drilled from the edge of the lens.

Further, I have produced a novel control mechanism having a variable movement for the drill spindle in that the swinging movement of the manually operated member for a given movement of the drill spindle gradually increases as the drill approaches the lens. My novel spindle control mechanism not only saves time in operation due to the rapid initial movement of the spindle produced thereby, but also provides a maximum leverage upon the drill spindle during the actual drilling of the lens.

Other objects and advantages pertaining to the details of the structure and to the specific relation and operation of the parts thereof will more fully appear from the following description taken in connection with the accompanying drawings, in which:

Figure 1 is a top plan view of a lens drilling machine embodying the various features of this invention and illustrating a part of the belt guide shieve bracket broken away;

Figure 2 is a longitudinal sectional view taken substantially in the plane of line 2—2, Figure 1;

Figure 3 is a horizontal sectional view through my novel lens chuck taken on line 3—3, Figure 2;

Figure 4 is a detail vertical sectional view taken on line 4—4, Figure 3;

Figures 5 and 6 are horizontal sectional views taken respectively on lines 5—5, and 6—6, Figure 2;

Figure 7 is a detail vertical sectional view taken on line 7—7, Figure 6;

Figure 8 is a detail side elevation of the right hand side of the drilling machine illustrating my novel control mechanism for the drill spindle;

Figures 9 and 10 are detail vertical sectional views taken respectively on lines 9—9 and 10—10, Figure 8;

Figure 11 is an enlarged vertical section view taken in the plane of line 11—11, Figure 2, illustrating the chuck jaws in gripping engagement with a lens;

Figure 12 is a diagrammatic view illustrating the adjacent portions of a lens; my novel chuck jaws for supporting the lens; and a drill; and the relation which these members bear to each other when in operative drilling position;

Figure 13 is a perspective view of a clutch jaw actuating spring;

Figure 14 is a perspective view of the upper positioned clutch jaws with the stop gauge associated therewith; and Figures 15 and 16 are enlarged detail side and plan views respectively of the lens holder, partly in section and partly in elevation, illustrating diagrammatically the adjacent portions of a chuck and cooperating head member with a lens operatively associated therewith.

The device illustrated in the drawings, comprises a sectional supporting frame having a base portion 1 and a vertically disposed standard 2 removably secured to the upper portion of the base 1 by screws 3. The standard 2 has a pair of vertical spaced horizontally disposed arms 3 which extend outwardly from one side thereof over the base 1. These arms 3 are provided near the outer ends thereof with alined holes providing bearings 4 in which is journaled the drill spindle 5. The spindle 5 is also mounted for vertical reciprocated movement in the bearings 4 and is connected to a carriage 6 adapted to produce reciprocating movement of the spindle 5.

The carriage 6 comprises a vertically disposed rod 7 mounted for vertical reciprocating movement in the standard 2 and a supporting arm 8 secured at one end to the upper end of the rod 7 as by the screw 9. The other end of the arm 8 is provided with a thrust bearing 10 which rotatably receives the upper end of the spindle 5. The upper end of the spindle 5 in this instance is grooved as at 11 for the reception of the roller members as the balls 12 of the bearing 10 whereby said spindle and thrust bearing are maintained in fixed relation against relative axial movement. The carriage 6 and spindle 5 are yieldingly urged toward the upper normal position thereof by a spring 13 coiled about the rod 7 and positioned between the lower arm 3 and a stop pin 14 secured to the rod 7, said pin being adapted to abut against the upper arm 3 for limiting the upward movement of the carriage 6 and spindle 5.

The lower end of spindle 5 terminates below the lower arm 3 and is provided with a suitable recess 15 for receiving a drill 16 which may be removably secured to the spindle in any suitable manner as by a screw 17.

The drill spindle 5 and drill 16 may be rotated from any suitable source of power as by a belt 19 passing over a pair of guide sheaves 20 and around a relatively broad faced pulley 21 secured to the spindle 5 intermediate the arms 3. The face of the pulley 21 is of sufficient axial length to permit the required vertical movement of the spindle 5 without producing any appreciable vertical movement of the adjacent portion of the belt 19.

The sheaves 20 are mounted upon a shaft 22 journaled in a supporting bracket 23 which is secured to the rear face of the standard 2 as by screws 24. One of the sheaves 20 is rotatably mounted upon the shaft 22, while the other sheave is secured to the shaft by a screw 25 for driving the same. The line of the belt 19 passes over the sheave 20 secured to the shaft 22 is maintained in running engagement with said sheave by means of an idler sheave 20' which is rotatably mounted upon a shaft 26, secured at its ends to the bracket 23 as illustrated in Figures 1 and 2. The sheave 20' not only guides the belt over the adjacent sheave 20, but also maintains the belt in sufficient frictional engagement with the sheave 20 to drive the sheave 20 and shaft 22. The shaft 22 has one end thereof extended outwardly a short distance beyond the bracket 23 and provided with a suitable chuck for the reception of a reamer R, file or other suitable tool which may be utilized in the manufacture of lenses.

As shown more particularly in Figure 2 of the drawings, the pulley 21 and the adjacent portion of the belt 19 may be partially enclosed by a shield 28, which, in this instance, is a semi-circular member in cross-section and is secured at its ends to the upper and lower arms 3 by screws 29.

The spindle 5 is manually moved downwardly to bring the drill 16 into engagement with the work as a lens L Figures 11 and 12 by a novel control mechanism, which in this instance, comprises a bell-crank member 30 pivotally connected to the carriage rod 7 by any suitable means as by the stop pin 14 which in this instance, is extended outwardly at one end for receiving the bell-crank. The bell-crank 30 is provided with two pivotal members as the shouldered screws 31 and 32 arranged substantially 90° apart and at substantially equal distances from the pin 14. Ones of these studs as 32 is pivotally connected to one end of a substantially vertically disposed link 33 which extends downwardly from the pin 32 and has the lower end thereof pivotally connected as at 34 to the standard 2, as shown in Figures 8 and 9. The other pivotal stud as 31 connected with the bell-crank member is secured to the upper end of a link 35 which extends downwardly from the stud 31 and has the lower end thereof connected as at 36 to the free end of a rock arm 37 which is rotatably mounted on a rod 38 secured at one end to the standard 2. The arm 37 is provided with an elongated hub 37' to which is secured an arm 39 that normally extends forwardly in a substantially horizontal plane from the rod 38 and has the outer end thereof provided with a finger-piece 39' adapted to be manually engaged for pressing said arm downwardly.

The link 33 and pivotal studs 31 and 32 on the bell-crank member 30 are so related with each other and with the pivot of the bell-crank member that when the carriage 6 and drill spindle 5 are in their normal uppermost position, the pivotal stud 32 will lie in substantially a horizontal plane passing through the pivot 14, while the screw 31 will be positioned in substantially a vertical plane passing through the pin 14.

It will, therefore, be seen that when the arms 39 and 37 are manually moved downwardly, the pivot 32 will be rocked forwardly about the pivot 34 as an axis as the rod 7 and pin 14 move downwardly until the stud 32 reaches a position substantially vertically of the pin 14 as indicated by broken lines in Figure 8. At the same time, the stud 31 will rotate about the pin 14 as an axis until said stud reaches a position in substantially a horizontal plane passing through the pin 14.

It will thus be understood that the ratio of angular movement of the arm 39 relative to the vertical movement of the drill spindle 5 and drill 16 progressingly increases as the drill approaches the lowermost position which not only has the advantage of producing a relatively rapid downward movement of the drill spindle to quickly bring the drill from the normal inoperative position into engagement with the work, but also provides a maximum leverage for feeding the drill through the work during the actual drilling of the work.

The downward movement of the drill spindle and drill is limited by an adjustable stop comprising, in this instance, a screw 42 screw-threaded in the arm 8 intermediate the spindle 5 and rod 7 for engagement with the upper arm 3 of the standard 2.

In the base 1 is mounted a work holder which, in this instance, comprises primarily a horizontally disposed chuck member 45 rotatably mounted in the upper portion of the base 1 and a supporting head member 46 rotatably mounted in a bracket 47 in coaxial alinement with the chuck 45. The bracket 47 is slidably mounted for movement toward and from the chuck upon a pair of horizontally disposed spaced guide rods 48 that are secured at one end in the base 1 and extend forwardly therefrom as shown in Figure 5.

The supporting head 46 comprises, in this instance, a circular disk 50 mounted upon or made integral with a shaft 51 that extends forwardly from the center portion of the disk and which is journaled in the upper portion of the bracket 47.

A handle 52 is secured to the outer or forward end of the shaft 51 and is adapted to engage shoulders 53 provided in the bracket 47 at diametrically opposite sides of the shaft 51 for limiting the rotary movement of the shaft 51 and disk 50 to substantially 180 degrees.

The inner-face of the disk 50, that is, the side of the disk facing the clutch 45, is provided with a circular recess 50' in which is mounted a pad 55 adapted to frictionally engage the outer or free edge portion of the lens held in the clutch 45. The pad 55 is preferably composed of soft sponge rubber, or the like, and the surface of the pad adjacent the clutch may, as shown, be slightly concave to enable the pad to efficaciously engage the more or less arcuate edges of the lenses.

The outer peripheral edge of the disk 50 is provided with a series of gear teeth 56 which are in meshing engagement with a spur gear 57 mounted on the forward end of a horizontally disposed shaft 58 which extends rearwardly through the base 1 and is journaled in a pair of spaced bearings 59 formed in said base. The shaft 58 is also adapted to move axially through the bearings 59 as the bracket 47 and clamping head 46 are moved toward and from the chuck 45.

The disk 50 is partially encased in a flanged cap member 60 mounted on the shaft 51 between the bracket 47 and disk 50. The flange as 60' of the cap 60 is adapted to surround the teeth 56 of the disk and has a slot 60'' formed at the lower portion thereof adapted to receive the upper portion of the gear 57 therein so that the gear 57 is clamped by the cap 60 to the bracket 47 to cause the gear and bracket to reciprocate in unison. The cap 60 is maintained against being rotated by the head 46 by means of a pin 62 (see Figure 2).

The shaft 58 extends a short distance beyond the rear face of the base 1 and has secured thereto a relatively broad-faced gear 64. This gear 64 is in meshing engagement with a relatively narrow-faced gear 65 which is secured to the chuck member 45 in a manner hereinafter more fully described as by screws 66 for producing a rotary movement of the chuck member simultaneously with the rotation of the head 46.

The chuck member 45, in this instance, comprises a cylindrical body portion 68 mounted for both rotary and axial movement in a bore 69 provided in the base 1, substantially normal to and intersecting the axis of the drill-spindle 5. The body 68 is provided with a cylindrical chamber 70 extending inwardly from the forward end of the body and which has the open end thereof closed by a cover member 71 secured to the front end of the body by screws 72, (see Figures 2 and 3). The rear portion of the body 68 is reduced in diameter as 68' and has the hereinbefore mentioned gear 65 secured thereto by the screws 66 which are screw-threaded in the rear end of the body 68.

On the reduced portion 68' of the body 68 is journaled an adjusting sleeve 74 that is externally threaded for threaded engagement with screw threads provided in the wall of the bore 69 at the rear portion thereof. The sleeve 74 is positioned between a thrust bearing 75, mounted adjacent the shoulder formed on the body 68 by the reduced portion thereof, and the gear 65. The adjusting sleeve 74 has the rear end thereof reduced in diameter as at 74' and a lever 76 for rotating the sleeve is mounted on the reduced portion 74' and is secured thereto by any suitable means as screw 77.

Rotatably mounted on the reduced portion 74' of the sleeve 74 between the lever 76 and the shoulder produced by the reduced portion of the sleeve is an index plate 78 which is provided with a scale 79 (see Fig. 4) the graduations of which have a definite relation with the threads per inch on the sleeve 74'. A vernier line 80 on the lever 76 is adapted to register with the graduation of the scale 79 to indicate the distance the hole to be drilled will be spaced from the adjacent edge of the lens in the manner presently described. The index plate 78 is provided with a lateral projection or detent 78' which extends into an aperture or slot 81 provided in the standard 2 for maintaining the index plate against being rotated by the sleeve 74 and lever 76 so that the scale 79 thereon will be maintained in a fixed predetermined position at all times.

It will now be readily understood that by moving the lever 76, a corresponding rotary movement of the adjusting sleeve 74 will be produced and cause said sleeve to be moved axially due to the threaded engagement thereof with the base 1. This axial movement of the sleeve 74 will produce a corresponding axial movement of the body 68 and the chuck jaws carried thereby toward and from the plane of axial movement of the drill 16 and thereby control the distance that the hole is drilled in the lens from the adjacent edge of said lens.

The jaws of the chuck comprise 4 similarly constructed members 82 arranged in two pairs with each member mounted for pivotal movement independently of the other members. The jaws 82 are supported at the forward end of the body 68 by the cover 71 which is provided with a centrally located substantially rectangular aperture 83 therethrough, through which the jaw members project. The cover 71 also is provided with a pair of diametrically opposed integral lugs 84 arranged one at a respective side of the opening 83. These lugs extend inwardly into the chamber 70 in spaced relation for receiving the jaw members 82 therebetween, as illustrated in Figure 3. The corresponding jaw members of each pair are pivotally mounted on a pin 85 which extends through a transversely disposed hole provided in the jaw members intermediate the longitudinal center and the forward or head end thereof. The ends of the pins 85 are secured in the cover lugs 84 as shown in Figure 3.

The head or gripping end of each jaw 82 is cut away at the inner vertical side thereof to form a substantially U-shaped recess 86 between the two pairs of jaws adapted to receive the drill 16 therethrough. The jaw members have their adjacent cooperating surface portions of the heads thereof curved both longitudinally and transversely as shown in Figures 11 and 12 to provide convex gripping surfaces which peculiarly adapt the jaws to uniformly contact with all forms of lenses and thus to uniformly engage opposed surfaces of the lens at opposite sides of the drill, and firmly hold the lens as the hole is being drilled.

The mechanism shown for closing the jaws to bring them into holding engagement with the work comprises in providing each jaw member 82 with a tapered tail portion 82', (see Figs. 2 and 3) which extends inwardly from the respective pivotal pin 85 to near the inner end of the chamber 70. The adjacent inner edge of the tail portion 82' of each pair of jaw members is beveled as at 86 so as to form a slight recess for the reception of a head 87 of a plunger 88. There are two of these plungers 88 as illustrated more clearly in Figure 3, one for each pair of jaws, and they are mounted for longitudinal reciprocated movement in suitable apertures 89 provided in the rear portion of the body 68 at diametrically opposite sides thereof and in cooperative alinement with a respective pair of jaws. The forward end of the heads 87 are reversely beveled as at 87' to enable the heads to readily enter between the respective pair of jaws and uniformly separate the tail portions thereof and thereby rock the jaw members of the respective pair about the pins 85 as an axis to move the heads or gripping ends of the jaws toward each other into holding engagement with the work and maintain the jaw heads of a corresponding pair of jaws equal distances either side of the axis of the chuck.

It will now be readily understood that inasmuch as the axis of the chuck 45 is normal to the axial movement of the drill 16, and the curved gripping surfaces of the jaws of each pair are always maintained equal distances from the axis of the chuck, the jaws will, as they grip the lens, automatically position the lens in such a manner that the medial plane of the lens at the place to be drilled will be substantially normal to the longitudinal movement of the drill.

In other words, the medial plane of each pair of jaws being always normal to the axial movement of the drill and as the engagement of the curved surfaces of the jaws with the respective curved surfaces of the lens is always normal to said lens surfaces at the point of tangency, it follows that the medial plane of the lens between said points of tangency will coincide with the axis of the chuck and also be normal to the longitudinal or axial movement of the drill.

The plungers 88 extend outwardly or rearwardly through suitable apertures provided in the gear 65 and are normally urged inwardly by compression springs 90 mounted one upon each plunger between the gear 65 and the head 87 of said plunger. The adjacent corresponding jaw members 82 of each pair of jaws are yieldingly urged toward the open position by means of a U-shaped spring member 92 which has the outer end of each leg thereof bent to extend substantially at right angles to the remaining portion of the leg, and inserted in a suitable aperture 93 provided in the respective jaw member a short distance forwardly from the respective pivotal pin 85. These spring members 92 extend inwardly from the apertures 93 with the transverse portion thereof engaging the wall of the chamber 70 near the inner end thereof, as illustrated in Figure 2.

The plunger members 88 are moved outwardly against the action of the springs 90 for releasing the jaw members by means of an arm 95 secured at one end upon a rod 96 which is slidably mounted in the base 1 at one side of the shaft 58, as shown more clearly in Figure 5. The opposite end of the arm 95 is operatively connected with the outer or rear end of each plunger 88 by means of a shouldered stud 97 secured to the end of the arm 95 by a screw 98. The stud 97 extends forwardly from the arm 95 through a circular recess 95' formed in the adjacent end of the arm 95 and is provided with a head 97' which is positioned between the rear ends of the plunger 88 in a slot 88' formed in the inner adjacent surfaces of the outer end of the plungers 88. The slots 88' are somewhat longer in axial length than the width of the head 97' so as to permit a predetermined relative longitudinal movement of each plunger 88 and stud 97. A hardened washer as 99 may, as shown, be mounted upon the stud 97 for extending into the slots 88' and engaging the outer or rear end of said slots as the arm 95 is moved rearwardly, for withdrawing the plungers 88 against the action of springs 90 from engaging relation with the jaws 82.

The chuck 45 also includes an abutting or stop gauge 100 for assisting in positioning the work in fixed predetermined relation with the jaws 82. The gauge as illustrated in the drawings consists of a flat plate positioned intermediate the pairs of jaw members 82 and is secured in position by the pins 85 which pass through suitable openings provided at the rear portion of the plate, as illustrated in Figures 2 and 3. The forward edge of the plate is formed V-shaped with the apex thereof positioned a predetermined distance inwardly from the outer ends of the jaw members and in a plane substantially midway between the jaws of each pair.

The arm 95 and, therefore, the jaw actuating plungers 88 are automatically moved rearwardly for releasing the jaws 82 and permitting said jaws to be opened by the action of the springs 92 by a manually operated lever 102 which also effects the movement of the bracket 47 and clamping head 46 toward and from the clutch 45. This lever 102 is positioned in a chamber 1' formed in the lower portion of the base 1 and is pivotally secured near its inner end to the base 1 by a shouldered screw 103. The lever 102 extends outwardly from the pivot 103 through a horizontally disposed slot 104 formed in the forward end and one side of the base 1 and has the outer end thereof formed as at 102' to provide a suitable finger-piece or handle by which the lever may be manipulated. The opposite or inner end of the lever extends inwardly beyond the pivot 103 a short distance to form a cam 105 adapted to engage a roller stud 106 secured to the inner end of the rod 96, as the outer end of the lever approaches the extreme forward position, as shown by full lines in Figures 1, 5, and 6, for moving the rod 96 and arm 95 rearwardly a sufficient distance to withdraw the plungers 88 from holding engagement with the chuck jaws.

The rod 96 has the inner end thereof slidably mounted in a suitable bearing as 107 made integral with the base 1 at the upper portion of the chamber 1' and the roller stud 106 extends downwardly from the rod 96 through an elongated slot 107' provided in the lower wall of the bearing 107 so that said stud will be maintained in the path of movement of the cam 105. The lever 102 is also provided with an offset or lateral portion 108 arranged at the opposite side of the pivot 103 to that at which the cam 105 is positioned. A shouldered stud 109 is connected to the lateral portion 108 of the lever in a plane intermediate the longitudinal center line of the lever and a stop pin 112 mounted in the base for limiting the forward movement of the lever.

A link 110 is mounted at one end upon the stud 109, said link being provided with an elongated slot 110' through which the stud 109 passes to permit a predetermined longitudinal movement of the link 110 relative to the stud 109. The link 110 extends forwardly from the stud 109 through the slot 104 of the base 1 and has the outer end thereof pivotally secured as by the stud 111 to the underside of the bracket 47 so that, when the lever 102 is moved to the forward position, the bracket 47 and head 46 will be moved outwardly away from the clutch 45 by said lever through the medium of the link 110. The slot 110' is of sufficient length to permit the required rearward movement of the lever 102 when a lens of exceptionally large diameter is being held between the head and chuck to bring the cam 105 out of engagement with the roller stud 106 and thus permit the rod 96, arm 95 and plungers 88 to be moved forwardly by the action of the springs 90 for moving the jaws 82 toward the closed position into gripping engagement with the work.

The connection of the stud 109 with the lever 102 is such that when the lever is in the foremost position the stud will lie in a plane intermediate the stop 112 and the plane passing through the pivots 103 and 111 for releasably maintaining the lever in the forward position.

The head 46 and bracket 47 are yieldingly moved rearwardly toward the chuck 45 when released by the lever 102 by the action of a coil spring 113 which has the rear end thereof connected to the base 1 by a screw eye 114. The forward end of the spring 113 is connected to one end of a rod 115 which has the other end thereof mounted on the stud 111 and, therefore, connected with the bracket 47.

The bracket 47 has a screw 118 screw threaded in one side thereof adapted to engage one of the guide rods 48 as illustrated in Figure 5 for the purpose of clamping the bracket to said rod and prevent movement of the bracket relative to the chuck 45 when desired.

Operation

It will now be readily understood that when the drill spindle 5 is being continuously rotated and when the lever 102 and head 46 are in the extreme forward position, the jaws 82 will be in the open position, and with the handle 52 resting against one of the shoulders 62, the recess 86 in said jaws will be in vertical alinement with the drill 16 as illustrated in the drawings, so that the machine is in position to receive a piece of work such as a lens therein.

In positioning a concavo-convex lens in the machine the lens is first inserted between the open jaws with the edge of the lens adjacent the place where the hole is to be bored in contact with the gauge 100. The outer end of the lever 102 is then moved rearwardly with the result that the cam 105 moves during the initial movement of the lever out of the path of movement of the roller stud 106, thereby releasing said stud and the rod 96, the arm 95, and the plungers 88, and permitting said plungers to be moved forwardly toward the jaw members 82 by the action of the springs 90.

As the plungers 88 are moved forwardly, the wedge-shaped heads 87 will enter between the tail portions 82' of the corresponding pairs of head members and move the forward or head ends of said members into gripping engagement with the lens and it will be noted that inasmuch as the plungers 88 when released by the head 97' of the stud 97 are free to move independently of each other within certain limits, each pair of jaws will be brought into substantially the same gripping relation with the lens as the other pair of jaws regardless of any variation in the form or contour between the surfaces engaged thereby so that the lens will be firmly gripped by both pair of jaw members. As the lever 102 is moved rearwardly, the bracket 47 is released by the handle and permitted to be moved rearwardly by the action of the springs 113 until the head disk 50 and pad 55 engage the outer or forward edge of the lens, and inasmuch as the head disk and pad are yieldingly maintained in engagement with the lens under considerable force by the action of the spring 113, it will be understood that the lens will be firmly held in the drilling position by the chuck jaws and said disk and pad members.

The drill 16 is then brought into operative engagement with the lens by the operator pressing downwardly on the lever 39 for drilling a hole substantially half way through the lens as determined by the stop 42. The drill is then permitted to be returned by the action of the spring 13 to the normal uppermost position, after which the lens is rotated 180 degrees about the axis of the chuck 45 and clamping head 46 to bring the opposite surface of the lens adjacent the drill 16.

This reversing of the lens is readily accomplished by merely swinging the handle 52 substantially 180 degrees from a position in contact with one of the shoulders 53 into contact with the other shoulder 53. The drill 16 is then lowered in the manner hereinbefore described into operative engagement with the lens and inasmuch as the lens is supported by the chuck and clamping head in such a position that the medial plane thereof at the point where engaged by the drill is substantially normal to the axial movement of the drill, the second formed hole will accurately aline with the first formed hole and thereby produce a continuous straight hole through the lens adapted to receive a clamping screw without the necessity of reaming or further treating the hole. The lens is then released by merely moving the outer end of the lever 102 to the extreme forward position. The chuck and clamping head are again in position to receive a piece of work and the first lens may be again placed therein in position to drill a hole diametrically opposite the first hole or a new lens may be inserted, as desired, and secured in position by simply moving the lever 102 rearwardly, in the manner hereinbefore described.

Where the lens to be drilled is a concavo-convex deep curve lens formed with a very marked difference in the length of the radii of the curve of the inside and outside surfaces, such as in the case of a strong plus or magnifying lens where the axial length of the lens is much greater at the middle than at the edge thereof, it will be readily understood that even as in the case with a bi-convex lens, owing to the convex contour of the gripping surfaces of the jaws 82, the jaws will not readily maintain the lens therebetween but tend to force the lens outwardly from between each pair of jaws. When a lens of this form is to be drilled, the lens is first inserted between the jaws in the manner previously described. The supporting head 46 is then released by the rearward movement of the lever 102 to permit said head to be moved into engagement with the free side of the lens by the spring 113, at the same time the jaw actuating plungers 88 are released by the lever 102 and moved into operative engagement with the jaws 82 for moving said jaws into gripping engagement with the lens. As the jaws normally engage the lens just prior to the time the head 46 engages the lens, the result is that when the jaws and head come to rest, the lens is only partially gripped by the jaws. In order to cause the jaws to firmly grip the lens, it is necessary to open said jaws to permit the lens to again enter therebetween. This opening of the jaws is readily accomplished by the operator pressing rearwardly on the bracket 95 to draw the plungers 88 rearwardly. As the jaws release the lens, while being thus moved to the open position, the lens will be automatically moved rearwardly between the gripping edges of the jaws into engagement with the stop 100 by the action of the spring 113 upon the bracket 47. The arm 95 is then released to permit the jaws to move into holding engagement with the lens after which the bracket 47 is locked against outward or forward movement by the manipulation of the screw 118 whereupon the lens will be firmly held in position to be drilled.

Furthermore, when positioning a deep curve lens, such as that illustrated in Figure 15 of the drawings, in the lens holder, the edge of the lens opposite the chuck jaws 82 will be disposed a considerable distance from the plane of the axis of the jaws or from the horizontal plane and the edge of the lens opposite the jaws is very readily supported without the necessity of special adjustments in any way.

It will also be noted by referring to Figure 16 of the drawings that my novel lens holder is equally efficacious in positioning and maintaining a lens having an irregular marginal surface in operative relation with the drill and the construction of the lens holder particularly adapts it for use with what is commonly called "Full-Vue" lens where the holes are drilled at the top corners of the lens. This universal adaptability of my novel lens holder is to a large extent due to the construction of the supporting head 46 and particularly the resilient nature of the pad 55 which peculiarly adapts it to contact the extreme opposite edge of the lens from the drilling point wherever it may come.

Although I have shown and particularly described the preferred embodiment of my invention, I do not wish to be limited to the exact construction shown as various changes both in the form and relation of the parts thereof may readily be made without departing from the spirit of the invention as set forth in the appended claims.

What I claim is:

1. In a lens drilling machine, in combination a drill spindle, work holding means adapted to grip the opposed refracting surfaces of the lens to be drilled, said work holding means being positioned so as to present one of said surfaces to the drill spindle, means for producing relative movement of the spindle and the work holding means toward each other to drill a hole extending substantially midway through the lens, and means for rotating said work holding means through 180 degrees about an axis intresecting and perpendicular to the axis of the spindle, said work holding means being adapted to hold the lens so that the plane defined by said axis of rotation and the axis of the spindle substantially bisects the lens, whereby after rotating said work holding means a second hole may be drilled in the lens from the opposite refracting surface thereof in coaxial alignment with the first hole.

2. A machine as in claim 1, wherein the work holding means comprises work gripping elements coacting at both sides of the plane defined by said axis of rotation and the axis of the spindle and movable in a direction substantially parallel to said plane for engagement with the opposed refracting surfaces of the lens.

3. In a drilling machine of the class described, the combination with a drill spindle, of work holding means rotatable about an axis intersecting and perpendicular to the axis of the spindle, said work holding means comprising work gripping elements coacting at both sides of the plane defined by said axes and movable in a direction substantially parallel to said plane for engagement in close proximity to the axis of the drill spindle with opposed work surfaces to be drilled, means for producing relative movement of the spindle and work holding means toward each other to drill a hole extending substantially midway through the work, and means for rotating the work holder with the work mounted therein about said axis of rotation whereby a second hole may be drilled in the work in coaxial alignment with the first hole.

4. A machine as in claim 3 wherein the work holding means is provided with an auxiliary work holding element movable toward the gripping elements into holding engagement with the work.

5. A machine as in claim 3 wherein the gripping elements are each provided with a curved gripping surface for contacting the work surfaces to be drilled.

6. A machine as in claim 3 wherein the gripping elements are each provided with a curved gripping surface for contacting the work surfaces to be drilled and the work holding means is provided with an auxiliary work holding element movable toward the gripping elements for engagement with an edge of the work opposite the gripping elements, said holding element being of substantial area for contacting said edge at various positions of the work as determined by the gripping elements.

7. A machine as in claim 3 wherein the work holding means is provided with an auxiliary work holding element movable toward the gripping elements into holding engagement with the work, and means including a single manually controlled operating member for successively effecting the engagement of the gripping elements and the auxiliary holding element with the work.

8. A machine as in claim 3 wherein the gripping elements are each provided with a curved gripping surface for contacting the work surfaces to be drilled, and the holding means is provided with an auxiliary work holding element movable toward the gripping elements for engagement with an edge of the work opposite the gripping elements, said holding element being of substantial area for contacting said edge at various positions of the work as determined by the gripping elements, and means including a single manually controlled operating member for successively effecting the engagement of the gripping elements and the auxiliary holding element with the work.

9. A machine as in claim 3 wherein the gripping elements are each provided with a curved gripping surface for contacting the work surfaces to be drilled and the work holding means is provided with an auxiliary work holding element movable toward the gripping elements for engagement with an edge of the work opposite the gripping elements, said holding element being of substantial area for contacting said edge at various positions of the work as determined by the gripping elements, and means for locking the gripping and holding elements against axial movement relative to each other when said elements are in operative engagement with the work.

10. A machine as in claim 3 wherein the work holding means is provided with an auxiliary work holding element movable toward the gripping elements into holding engagement with the work, and a stop member is connected with the work holder to rotate therewith, said stop member being adapted to contact the work to be drilled to position the same with respect to the axis of the spindle.

11. A machine as in claim 3 wherein the work holding means is provided with an auxiliary work holding element movable toward the gripping elements into holding engagement with the work, and a stop member is connected with the work holder to rotate therewith, said stop member being adapted to contact the work to be drilled to position the same with respect to the axis of the spindle, and means for moving the stop toward and from said axis of the spindle.

12. In a lens drilling machine, the combination with a frame and a drill spindle carried by the frame, of two pairs of lens gripping jaw members mounted in the frame to rotate about an axis which intersects the axis of the drill spindle at right angles thereto, said pairs of jaws being arranged one at either side of said axis of rotation and having curved gripping surfaces adjacent the point of intersection of said axes for engagement with opposed refracting lens surfaces to be drilled and being spaced apart a distance to permit a drill to pass therebetween, operating means for normally maintaining the jaws in cooperative relation with the lens, and means for rotating the jaws while in engagement with the lens to present said opposed refracting surfaces of the lens to the drill.

13. In a lens drilling machine, the combination with a frame and a drill spindle carried by the frame, of two pairs of lens gripping jaw members mounted in the frame to rotate about an axis which intersects the axis of the drill spindle at right angles thereto, said pairs of jaws being arranged one at either side of said axis of rotation and having curved gripping surfaces adjacent the point of intersection of said axes for engagement with opposed refracting lens surfaces to be drilled and being spaced apart a distance to permit a drill to pass therebetween, operating means for each pair of jaws adapted to yieldingly urge said jaws into cooperative relation with each other independently of the other pair of jaws, and means for rotating the jaws while in engagement with the lens to present said opposed refracting surfaces of the lens to the drill.

14. In a lens drilling machine, the combination with a frame and a drill spindle carried by the frame, of two pairs of lens gripping jaw members mounted in the frame to rotate about an axis which intersects the axis of the drill spindle at right angles thereto, said pairs of jaws being arranged one at either side of said axis of rotation and having curved gripping surfaces adjacent the point of intersection of said axes for engagement with opposed refracting lens surfaces to be drilled and being spaced apart a distance to permit a drill to pass therebetween, a stop mounted intermediate the two pairs of jaw members, operating means for normally maintaining the jaws in cooperative relation with the lens, and means for rotating the jaws, stop and operating means in unison during the engagement of the jaws with the lens to present refracting surfaces of said lens to the drill.

15. A machine as in claim 14 in which is provided separate means for moving the jaw members, stop and operating means axially toward and from the axis of the drill spindle.

16. In a lens drilling machine, the combination with a frame and a drill spindle carried by the frame, of two pairs of lens gripping jaw members mounted in the frame to rotate about an axis which intersects the axis of the drill spindle at right angles thereto, said pairs of jaws being arranged one at either side of the axis of rotation and having curved gripping surfaces adjacent the point of intersection of said axes for engagement with opposed refracting lens surfaces to be drilled and being spaced apart a distance to permit a drill to pass therebetween, operating means for normally maintaining the jaws in cooperative relation with the lens, a holding disc arranged substantially normal to the axis of rotation of the gripping jaws and supported by the frame in spaced relation to the jaws for receiving a lens therebetween, means for producing axial movement of the disc toward the jaws to bring the same into supporting engagement with the edge of the lens opposite said jaws, and means for rotating the jaws and disc in unison during the engagement thereof with the lens to present said opposed refracting surfaces of the lens to a drill carried by the spindle.

17. In a lens drilling machine, the combination with a frame and a drill spindle carried by the frame, of two pairs of lens gripping jaw members mounted in the frame to rotate about an axis which intersects the axis of the drill spindle at right angles thereto, said pairs of jaws being arranged one at either side of the axis of rotation and having curved gripping surfaces adjacent the point of intersection of said axes for engagement with opposed refracting lens surfaces to be drilled and being spaced apart a distance to permit a drill to pass therebetween, operating means for maintaining the jaws in cooperative relation with the lens, a stop mounted intermediate the two pairs of jaw members, a holding disc supported by the frame in spaced relation to the jaws and stop to receive a lens therebetween, means for adjusting the jaws and stop toward and from the axis of the drill spindle, separate means for producing axial movement of the disc toward the jaws and stop to bring said disc into supporting engagement with the edge of the lens opposite said jaws and stop, and means for rotating the jaws, stop and disc in unison during the engagement thereof with the lens to present said opposed refracting surfaces of the lens to a drill carried by the spindle.

18. In a lens drilling machine, the combination with a frame and a drill spindle carried by the frame, of two pairs of lens gripping jaw members mounted in the frame to rotate about an axis which intersects the axis of the drill spindle at right angles thereto, said pairs of jaws being arranged one at either side of the axis of rotation and having curved gripping surfaces adjacent the point of intersection of said axes for engagement with opposed refracting lens surfaces to be drilled and being spaced apart a distance to permit a drill to pass therebetween, operating means for maintaining the jaws in cooperative relation with the lens, a stop mounted intermediate the two pairs of jaw members, a holding disc supported by the frame in spaced relation to the jaws and stop to receive a lens therebetween, means for producing axial movement of the disc toward the jaws and stop to bring said disc into supporting engagement with the edge of the lens opposite said jaws and stop, means for locking said disc against axial movement when in the lens engaging position, and means for rotating the jaws, stop and disc in unison during the engagement thereof with the lens to present said opposed refracting surfaces of the lens to a drill carried by the spindle.

19. A drilling machine for a lens or the like having opposed arcuate side surfaces comprising in combination a drill spindle, a frame for rotatably supporting the spindle, a work chuck mounted in the frame at one side of the axis of the drill spindle to rotate about an axis intersecting the axis of the spindle at right angles thereto, said chuck having jaws provided with curved gripping surfaces coacting at either side of the plane defined by said axes, means for moving the jaws in a direction substantially parallel to said plane for engagement with said opposed arcuate side surfaces whereby the work will be positioned at an inclination to the axis of the chuck with the medial plane of the work between the chuck jaws normal to the axis of the drill spindle, a work-holding member rotatably supported by the frame at the opposite side of the axis of the spindle to that of the chuck and in coaxial relation with said chuck, said holding member having a work engaging surface of substantial dimensions extending substantially normal to the axis of rotation thereof for engaging the edge of the work opposite the chuck, and means for rotating the chuck and the holding member in unison during the engagement thereof with the work to present said opposed arcuate side surfaces of the work to a drill carried by the spindle.

20. In a drilling machine for a lens or the like having opposite arcuate side surfaces comprising in combination a drill spindle, a frame for rotatably supporting the spindle, a work chuck mounted in the frame to rotate about an axis intersecting the axis of the spindle at right angles thereto, said chuck comprising two pairs of jaw members provided with curved gripping surfaces, said jaws being arranged substantially parallel with the axis of rotation thereof and with one pair at either side of the plane defined by said axes, means supporting the jaws for swinging movement in a direction substantially parallel to said plane defined by the axes, jaw operating means movable axially of the chuck for yieldingly swinging the jaws of each pair independently of the jaws of the other pair to bringing the curved surfaces thereof into gripping engagement with said opposed arcuate side surfaces so that the work will be positioned with the medial plane of that portion of the work located between the chuck jaws coincident with the point of intersection of said axes and normal to the axis of the drill spindle, means for rotating the chuck 180 degrees during the engagement of the jaws with the lens, and means for producing relative movement of the chuck and drill spindle toward each other whereby holes may be drilled in said opposed surfaces of the work coaxially with each other.

21. A machine as in claim 20 having manually operable means for simultaneously moving the jaw members out of engagement with the lens.

22. A machine as in claim 20 wherein the jaw operating means comprises a pair of spring actuated plungers.

23. A machine as in claim 20 wherein the jaw operating means comprises a pair of spring actuated plungers, manually controlled means connected with the plungers for simultaneously moving the plungers out of operative engagement with the jaws to release the jaws, and means effective upon the release of the jaws to move said jaws to the open position out of engagement with the lens.

ELI M. LONG.